United States Patent [19]
Fujimura

[11] Patent Number: 5,159,275
[45] Date of Patent: Oct. 27, 1992

[54] METHOD AND APPARATUS FOR DETECTING CABLE LENGTH

[75] Inventor: Nobuaki Fujimura, Kodaira, Japan

[73] Assignee: Hitachi Denshi Kabushiki Kaisha, Tokyo, Japan

[21] Appl. No.: 621,973

[22] Filed: Dec. 4, 1990

[30] Foreign Application Priority Data

Dec. 6, 1989 [JP] Japan .................. 1-140670[U]
Dec. 6, 1989 [JP] Japan .................. 1-315248

[51] Int. Cl.⁵ .................. G01N 22/00; G01R 27/00
[52] U.S. Cl. .................. 324/617; 324/644; 324/647; 324/83 R; 324/84
[58] Field of Search .................. 307/514, 515, 516; 364/562; 324/617, 82, 83 R, 84, 644, 647

[56] References Cited

U.S. PATENT DOCUMENTS

| | | | |
|---|---|---|---|
| 3,388,327 | 6/1968 | Sutton | 324/617 |
| 4,118,665 | 10/1978 | Reihardt | 324/617 |
| 4,146,835 | 3/1979 | Chnapko | 324/617 |
| 4,151,490 | 4/1979 | Bazin . | |
| 4,300,092 | 11/1981 | Strenglein | 324/617 |
| 4,703,251 | 10/1987 | Baumgartner | 324/617 |
| 4,814,689 | 3/1989 | Obara | 324/617 |

*Primary Examiner*—Kenneth A. Wieder
*Assistant Examiner*—Jose M. Solis
*Attorney, Agent, or Firm*—Antonelli, Terry, Stout & Kraus

[57] ABSTRACT

Method and apparatus for detecting a length of a cable connecting information equipments are disclosed. A reference signal which is a repetitively occurring signal is transmitted through a cable. A phase difference between the reference signal transmitted through the cable and the reference signal directly transmitted without routing the cable is detected, and a signal representing the cable length is produced based on the detected phase difference.

29 Claims, 11 Drawing Sheets

METHOD AND APPARATUS FOR DETECTING CABLE LENGTH

BACKGROUND OF THE INVENTION

The present invention relates to method and apparatus for detecting cable length of a connecting cable between units in a video equipment or an information processing apparatus.

In the video equipment or information processing apparatus, frequency characteristic of a video signal or information signal transmitted is degraded corresponding to the length of a signal transmission cable connecting the units.

For example, in the connection of a television camera 13 and a camera control unit 14 shown in FIG. 2, as the lengths of connecting cables (e.g., coaxial cables) 15 and 16 between the television camera 13 and the camera control unit 14 is increased, the frequency characteristic of the video signal is increased degraded. As a result, it is necessary to compensate for this characteristic of the cable in the television camera 13 or the camera control unit 14. In order to compensate for the cable characteristic, a manual system in which the length of the cable is measured and the degree of compensation is selected corresponding to the length, and an automatic compensation system in which a cable length detection circuit for automatically detects the cable length and the compensation is made corresponding to the detected length have been proposed. A prior art of the automatic compensation system with the cable length detection circuit is shown in U.S. Pat. No. 4,151,490, for example. In this prior art, a reference signal is added to a video signal to be transmitted through a cable, at an input end of the cable, and a video signal is compensated in accordance with an amount of the attenuation of an amplitude of the reference signal at an output end.

SUMMARY OF THE INVENTION

In the above prior art, since it is necessary to externally apply the reference signal as a signal for measuring an amount of attenuation of the signal corresponding to the cable length, a configuration is complex, and costs increase, and, further, it is difficult to precisely detect the cable length because the compensation characteristics corresponding to the cable length is directly calculated from the attenuated amplitude of the reference signal. In order to improve the detection precision, the amplitude of the reference signal must be increased but this increases power consumption.

It is an object of the present invention to eliminate the defects of the prior art and provide method and apparatus for precisely detecting the cable length.

In order to achieve the above object, in accordance with one aspect of the present invention, a reference signal which is a repetitively occurring signal is transmitted over a cable under measurement, a phase difference between the reference signal transmitted through the cable and the reference signal directly transmitted without routing the cable is detected, and a signal representing the cable length is produced based on the detected phase difference.

The cable length can be precisely detected by detecting the cable difference by the phase difference.

Preferably, a plurality of signals representing the phase differences may be averaged to produce a signal representing the cable length.

Preferably, the reference signal may be a fixed frequency signal and the reference signal may be a synchronous signal.

Assuming that a period of the reference signal is T, a pulse width of the signal representing the phase difference is tw; a pulse amplitude of the signal representing the phase difference is V; and a duty factor of the signal representing the phase difference is D; a mean amplitude Av of the signal representing the phase difference is given by $Av = (tw/T)V = DV$. Thus, the cable length is given by $kAv$, where $k$ is a constant.

In accordance with another aspect of the present invention, the reference signal which is the repetitively occurring signal is transmitted over the cable under measurement, a frequency of the reference signal transmitted through the cable is multiplied by a factor of N (an integer) a frequency of the reference signal directly transmitted without routing the cable is multiplied by the factor of N, a phase difference between the reference signal transmitted through the cable and multiplied by the factor of N and the reference signal directly transmitted without routing the cable and multiplied by the factor of N is detected, and a signal representing the cable length is produced based on the detected phase difference.

In accordance with a further aspect of the present invention, the frequency of the reference signal which is the repetitively occurring signal is multiplied by the factor of N (an integer), the multiplied reference signal is transmitted over the cable under measurement, a phase difference between the multiplied reference signal transmitted through the cable and the multiplied reference signal directly transmitted without routing the cable is detected, and a signal representing the cable length is produced based on the detected phase difference.

By multiplying the frequency of the reference signal by the factor of N for use as the phase comparison reference signal, the mean phase difference Av is given by $$Av = \frac{tw}{T/N} \cdot V = N \cdot \frac{tw}{T} V.$$

Thus, the cable length can be detected with N times as high detection precision as that of the above case.

A signal extracted from an information signal may be used as the reference signal. In this case, the information signal may be a video signal, and the reference signal in this case may be a horizontal or vertical synchronous signal or a black level signal.

DESCRIPTION OF THE PREFERRED EMBODIMENTS

The embodiments of the present invention will now be explained with reference to the accompanying drawings, in which the like numerals in the respective embodiments designate the elements having the like functions.

Figure 1:
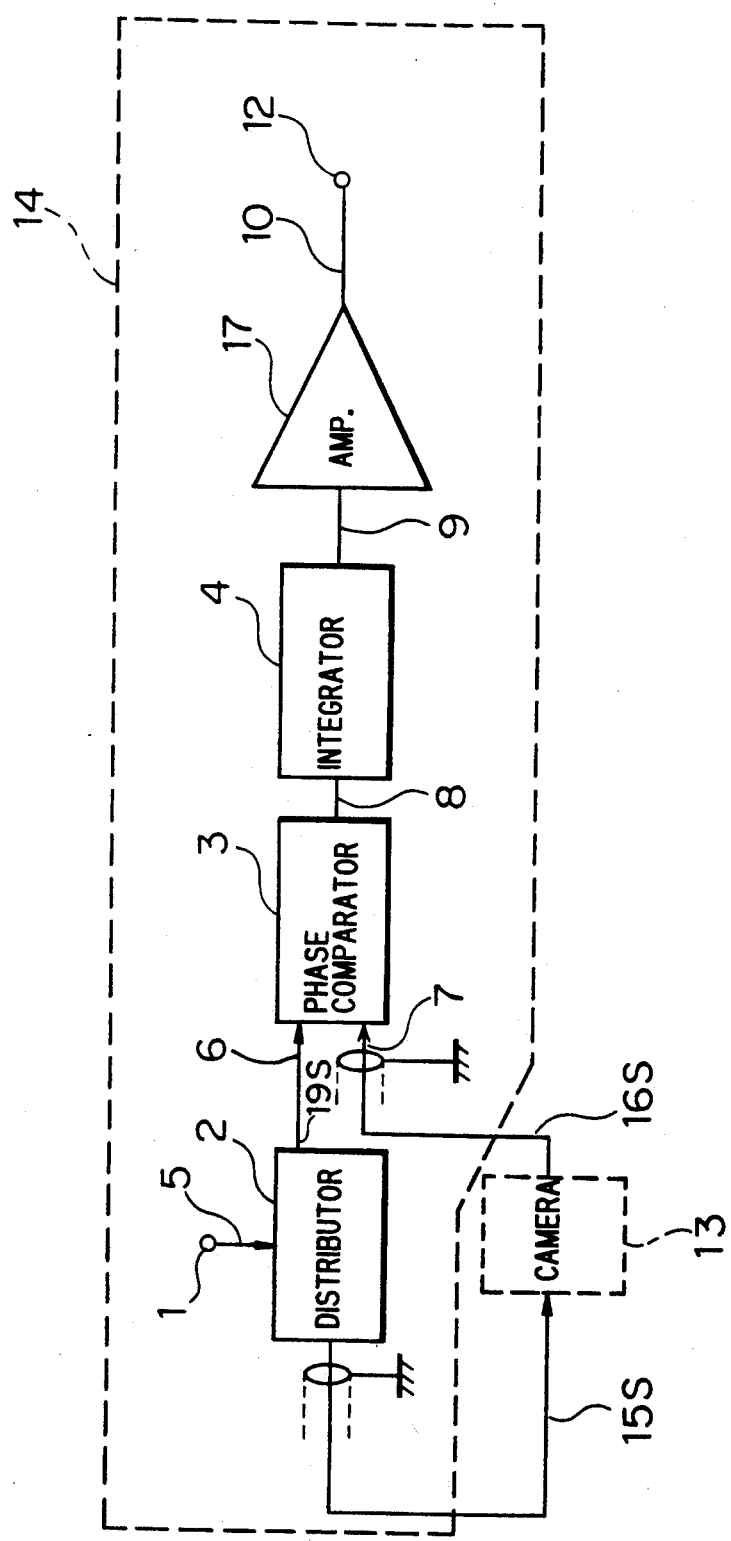
FIG. 1 shows a block diagram of a first embodiment of a cable length detection apparatus of the present invention.
Figure 2:
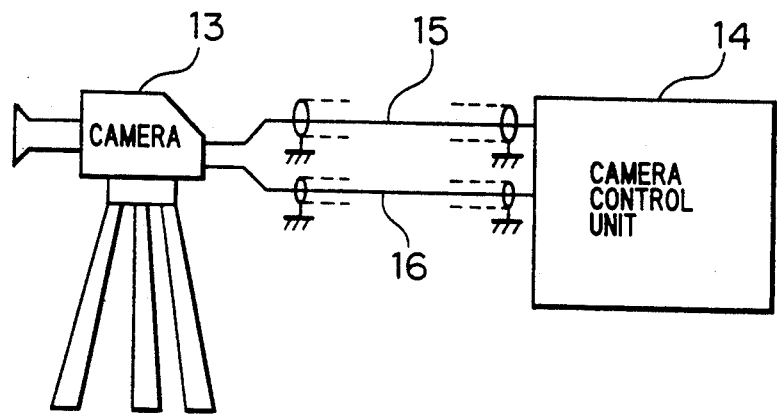
FIG. 2 shows a connecting cable between a television camera and a camera control unit in the embodiment of the present invention.

FIG. 1 shows a block diagram of a first embodiment in which the present invention is applied to the detection of cable length between video equipment as shown in FIG. 2. In the present embodiment, a synchronous signal, for example, a horizontal synchronous signal contained in a video signal which is an information signal is used as a reference signal.

In FIG. 1, numeral 1 denotes an input terminal to which a horizontal synchronous signal 5 extracted from the video signal by a circuit (not shown) is applied, and numeral 2 denotes a distributor for distributing the synchronous signal applied to the terminal 1 to synchronous signal cables, for example, coaxial cables 19S and 15S. The length $L_1$ of the cable 19S is known and a total length $L_2$ of the cables 15S and 19S is not known. Numeral 13 denotes a transmission/reception unit located between the cables 15S and 16S a signal supplied from the cable 15S is outputted to the cable 16S with the same phase. In connection with FIG. 2, numeral 13 denotes a television camera, and numeral 14 denotes a camera control unit, a portion of which corresponds to the detection apparatus of the present invention. The cables 15S and 16S are of the same length. Numeral 3 denotes a phase comparator which receives synchronous signals 6 and 7 transmitted through the cables 19S and 16S, respectively, compares the phases thereof and produces a signal representing a phase difference, numeral 4 denotes a circuit such as an integrator for averaging the signal representing the phase difference supplied from the phase comparator 3, numeral 17 denotes an amplifier for amplifying the signal supplied from the integrator 4, and numeral 12 denotes an output terminal to which the output of the amplifier 17 is supplied.

In the present embodiment, a phase difference, which corresponds to a difference $(L_2-L_1)$ between the cable lengths, between the output signal 6 of the distributor 2 through the cable 19S and the output signal 7 of the distribution 2 through the cables 15S and 16S is detected by the phase comparator 3, and the detected signal representing the phase difference is averaged by the integrator 4. The integrated signal 9 is amplified by the amplifier 17 to an appropriate level to produce a cable length detection signal 10.

Figure 3:
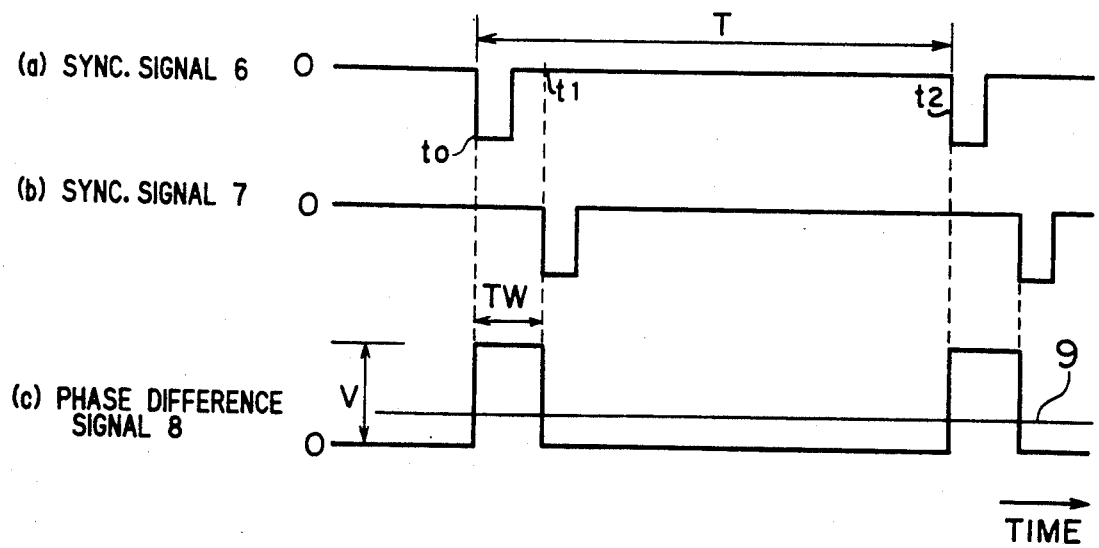
FIG. 3 shows a timing chart of signal waveforms at various points in the first embodiment.

FIG. 3 shows a timing chart of the signals in FIG. 1.

(a) of FIG. 3 shows a waveform of the synchronous signal 6 from the distributor 2 when it is applied to the phase comparator 3 through the cable 19S, and (b) of FIG. 3 shows a waveform of the synchronous signal 7 when it is applied to the phase comparator 3 through the cables 15S and 16S. The signal 7 includes a time delay $(t_1-t_0)$ corresponding to the cable length difference $(L_2-L_1)$, compared to the signal 6. (c) of FIG. 3 shows a waveform of a signal 8 which represents a phase difference between the signals 6 and 7. The phase difference signal 8 resulted from the phase comparison is a pulsation signal waveform produced by edge triggering, that is, in response to falling edges of the synchronous signals 6 and 7. Accordingly, the pulse width tw of the signal 8 is proportional to the cable length difference $(L_2-L_1)$. The signal 8 is smoothened by the integrator 4 to produce a signal waveform 9 shown in (c) of FIG. 3. The amplitude Av of the signal waveform 9 is given by $$Av = \left(\frac{tw}{T}\right) \cdot V = DV \tag{1}$$

where

Av: mean value of the signal 8
T: period of the reference signal
tw: pulse width of the signal 8
v: pulse amplitude (voltage) of the signal 8
D: duty factor of the signal 8.

Figure 4:
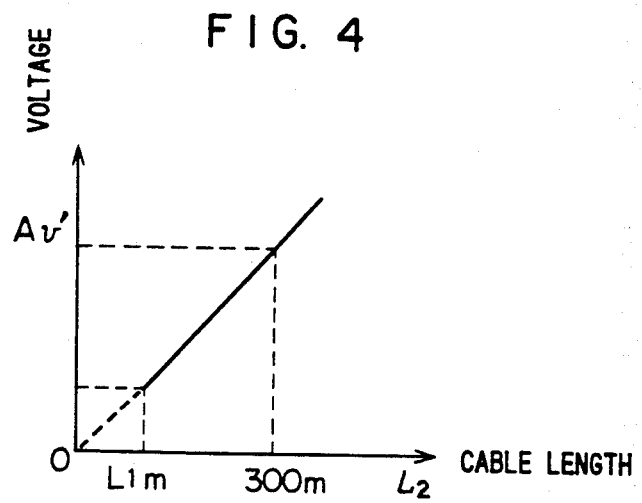
FIG. 4 shows a relationship between a cable length and a detected signal.

It is seen from the formula (1) that the mean value Av of the output signal 8 of the phase comparator 3 is proportional to the duty factor D. The voltage Av and the cable length difference $(L_2-L_1)$ have a relationship of $(L_2-L_1)=kAv$, where k is a constant. Accordingly, when an appropriate bias is applied to the signal 9 by the amplifier 17 to produce a cable length detection signal 10, an amplitude Av' thereof and the cable length $L_2$ have a relationship of $L_2=kAv'$. The relationship between the cable length $L_2$ and the voltage Av' is shown in FIG. 4. Thus, the cable length $L_2$ can be detected by measuring the signal voltage Av' at the output terminal 12.

Alternatively, the cable length difference $(L_2-L_1)$ may be determined from the signal voltage Av and the known length $L_1$ may be added thereto to determine the cable length $L_2$.

Figure 5:
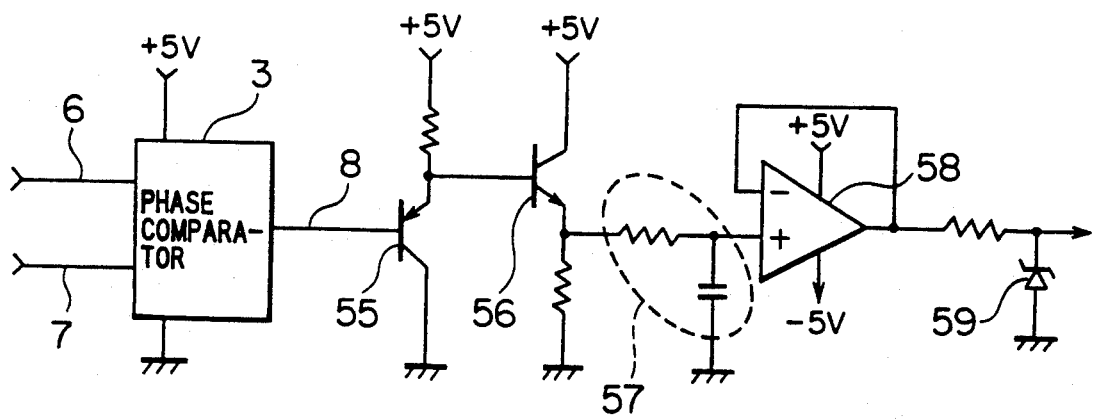
FIG. 5 shows a circuit diagram of a portion of the first embodiment.

FIG. 5 shows a circuit diagram corresponding to the phase comparator. The synchronous signals 6 and 7 are compared by the phase comparator 3, and the output signal 8 is shaped by a switching transistor 55, transmitted through an emitter follower circuit 56 and integrated by an integration circuit 57. Then, it is outputted as the cable length detection signal 10 through a buffer 58 and a limiter diode 59. The transistors 55 and 56 and the integration circuit 57 constitute the integrator 4 of FIG. 1, and the buffer 58 and the diode 59 constitute the amplifier 17.

In the present embodiment, since the cable length is detected by the phase difference, the cable length can be precisely detected.

Where a synchronous signal contained in a video signal of the BTA (Broadcast Technology Association) standard corresponding to the SMPTE (Signal Parameters of the 1125/60 High Definition Television Production System) standard used in a high definition television camera is used as the reference signal, the degradation of the characteristic in the video signal should be within 1 dB at 30 MHz.

Usually, the characteristic degradation of 1 dB corresponds to the cable length of approximately 30 meters (one way). Accordingly, a detection circuit which has a capability of discriminating the cable length of at least 30 meters is required.

It is assumed that the cable length detection circuit uses the horizontal synchronous signal as the phase comparison reference signal. The period of the horizontal synchronous signal of the BTA standard is 29.6 μs while the delay time of the signal caused by the cable length of 30 meters is approximately 0.3 μs. Accordingly, the duty factor D for the period is approximately 1%. Thus, the mean output voltage Av is V/100 (v).

Actually, it is difficult to precisely detect the cable length with the sensitivity which is 1% of the pulse amplitude (voltage) and the detection precision of at least approximately 5% is required.

In the first embodiment, it is necessary to increase the pulse amplitude (voltage) of the phase comparison reference signal in order to improve the detection precision. This leads to the increase of the power consumption.

Figure 6:
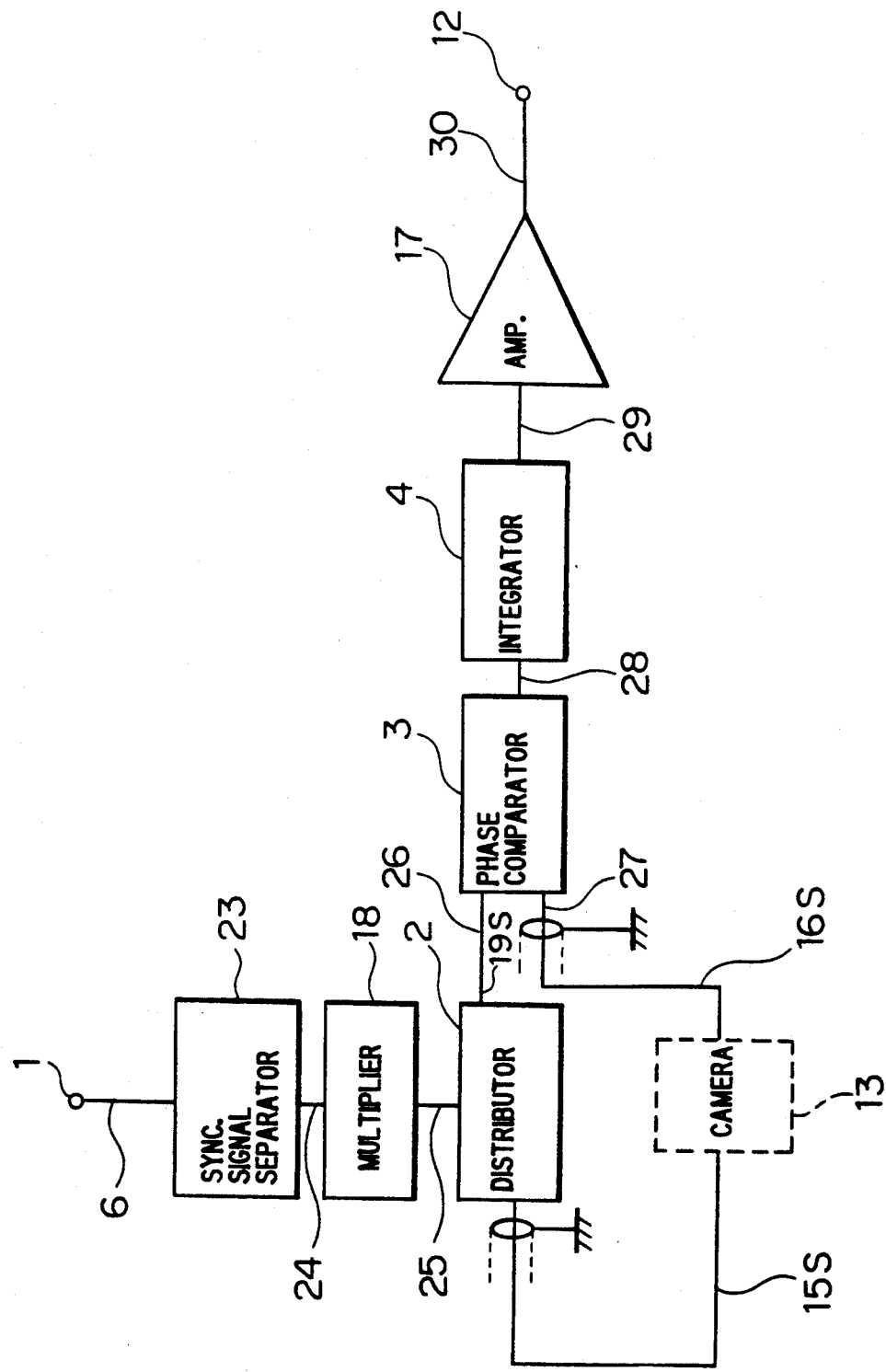
FIG. 6 shows a block diagram of a second embodiment.

A second embodiment which can improve the detection precision without increasing the amplitude of the reference signal is described below. FIG. 6 shows a configuration of the second embodiment, and FIG. 7 shows signal waveforms at various points of the configuration of FIG. 6.

In FIG. 6, numeral 21 denotes a terminal to which an information signal, for example, a video signal 22 is applied, numeral 23 denotes a synchronous signal separator which separates and extracts a reference signal, for example, a horizontal synchronous signal 24 from the video signal, and numeral 18 denotes a multiplier which multiplies a frequency of the extracted synchronous signal by a factor of N (an integer, for example, 5). Other elements are same as those of the embodiment of FIG. 1.

The video signal 22 applied to the terminal 21 is supplied to the synchronous signal separator 23 where the synchronous signal is extracted and it is converted by the multiplier 18 to a signal having N times as high frequency as that of the synchronous signal. An output signal 25 from the multiplier 18 is supplied to the distributor 2 where it is distributed to a signal 26 supplied to one input of the phase comparator 3 through the cable 19S and signal 27 supplied to the other input of the phase comparator 3 through the cables 15S and 16S. Numeral 13 denotes transmission/reception unit located between the signal transmission cables 15S and 16S. The signal supplied from the cable 15S is outputted from the cable 16S with the same phase. A phase difference is generated between the signals 26 and 27 due to the cable length difference $L_2 - L_1$, and it is detected by the phase comparator 3.

Figure 7:
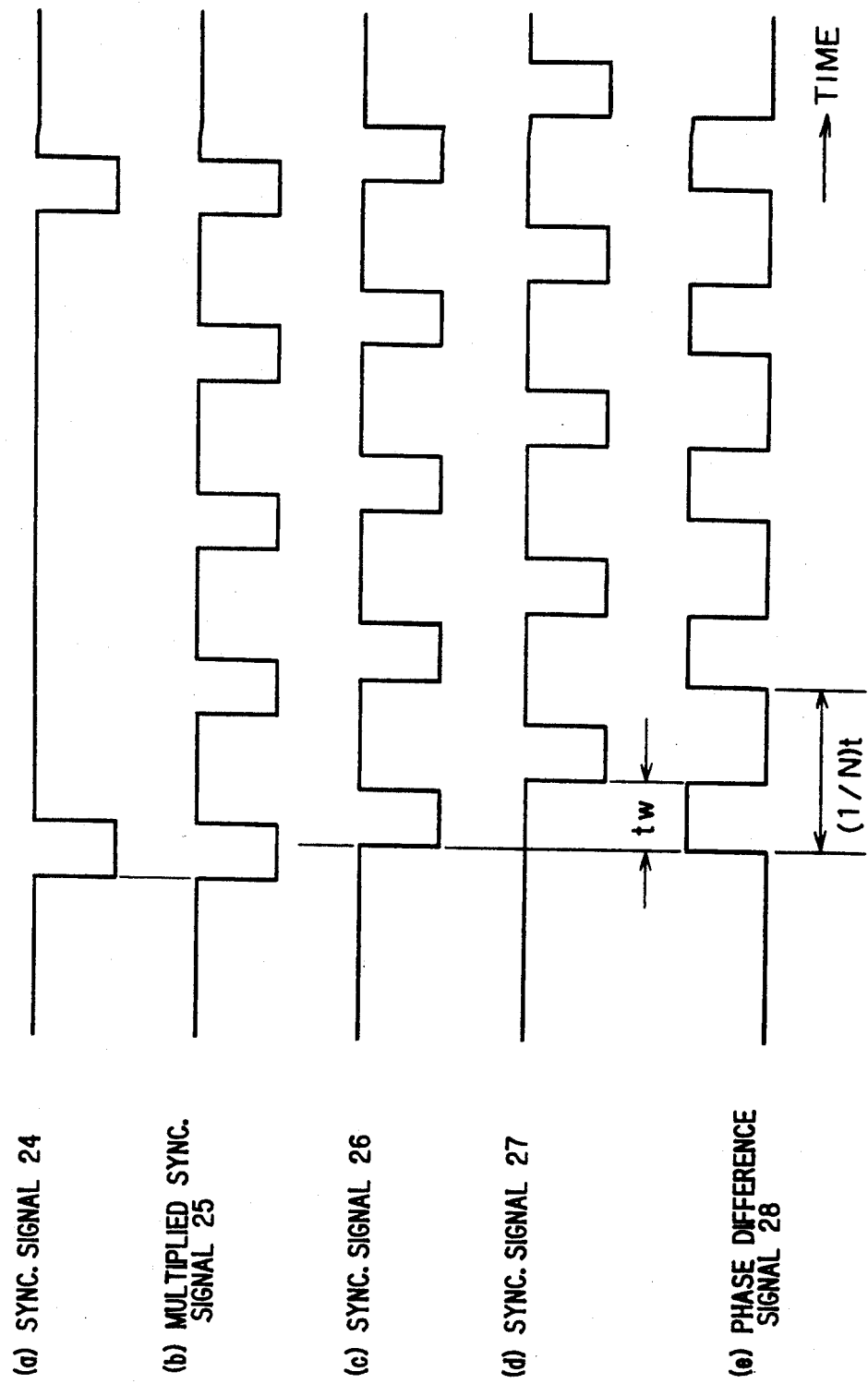
FIG. 7 shows a timing chart of signal waveforms at various points in FIG. 6.

FIG. 7 shows a timing chart of signals at various points in FIG. 6. The synchronous signal 24 in FIG. 6 is shown in (a) of FIG. 7. The signal 24 is converted by the multiplier 18 to the phase comparison signal 25 ((b) of FIG. 7) of N times higher frequency (1/N period). The signal 25 is divided into two paths by the distributor 2. One of them is the signal 26 ((b) of FIG. 7) applied to one input of the phase comparator 3 through the cable 19S from the distributor 2 The phase thereof is slightly retarded from that of the synchronous signal 25. The other is the signal 27 ((d) of FIG. 7) which is further delayed compared to the signal 26 due to the transmission through the cables 15S and 16S. Those two signals 26 and 27 are compared by the phase comparator 3 to produce the phase difference signal 28 ((e) of FIG. 7). The phase difference signal 28 is averaged by the integrator 4 to produce the voltage representing the phase difference, that is, the cable length information.

In the present embodiment, since the reference signal having the 1/N period relative to that of the reference signal in the first embodiment is used, the mean amplitude Av of the output signal 29 of the integrator 4 is given by $$Av = \frac{tw}{T/N} \cdot V = N \cdot \frac{tw}{T} \cdot V \quad (2)$$

Accordingly, the cable length $L_2$ can be detected with the N times higher precision than that of the first embodiment. Where N=5 and the video signal of the BTA standard is used, the detection precision of 5% is attained. By properly setting the value N in accordance with the precision required by the information signal to be transmitted, the cable length can be detected with a sufficient precision.

Figure 8:
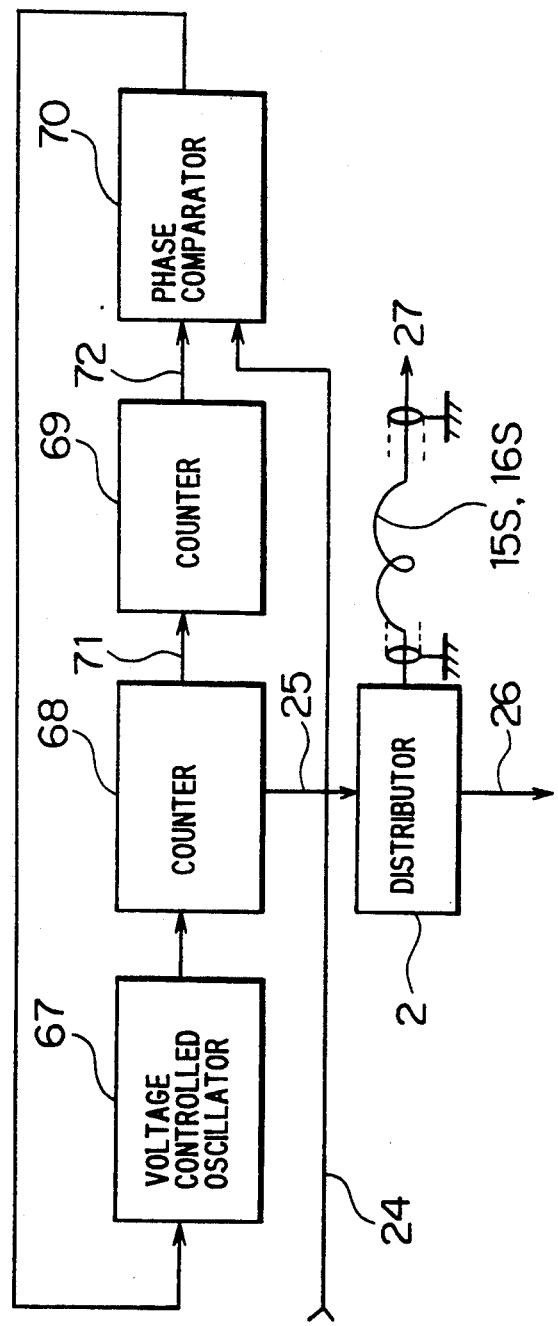
FIG. 8 shows a configuration of a multiplier in the second embodiment.

FIG. 8 shows a block diagram of a configuration of the multiplier 18 of FIG. 6. A source signal outputted from a voltage controlled oscillator 67 is multiplied by a counter 68 to have a period which is 1/N of that of the reference signal (synchronous signal) 24 for use as the phase comparison reference signal 25 to compare the phases by the phase comparator 3. The output signal 71 of the counter 68 having the 1/N period is frequency-divided by a counter 69 to N times larger period to produce a signal 72 having the same period as that of the reference signal 24. A phase comparator 70 compares the phases of the signal 72 and the reference signal 24 (by forming a phase-locked loop) to produce the phase comparison reference signal 25 which is in synchronism with the reference signal 24 and has 1/N period of that of the reference signal 24. The signal 25 having the 1/N period is divided by the distributor 2 into the signal 26 which is applied to the phase comparator 3 through the cable 19S and the signal 2 which is supplied through the cables 15S and 16S.

In the first and second embodiments, it is necessary to separately connect the reference signal transmission cables 15S and 16S for measuring the cable length in addition to the video signal transmission cables 15 and 16 as the connecting cables between the equipments, for example, the camera 13 and the control unit 14.

A third embodiment to be described below eliminates the need of such separate cables. In the third embodiment, the video signal is transmitted through the cable under measurement and the reference signal is extracted therefrom and multiplied for use in the phase comparison.

Figure 9:
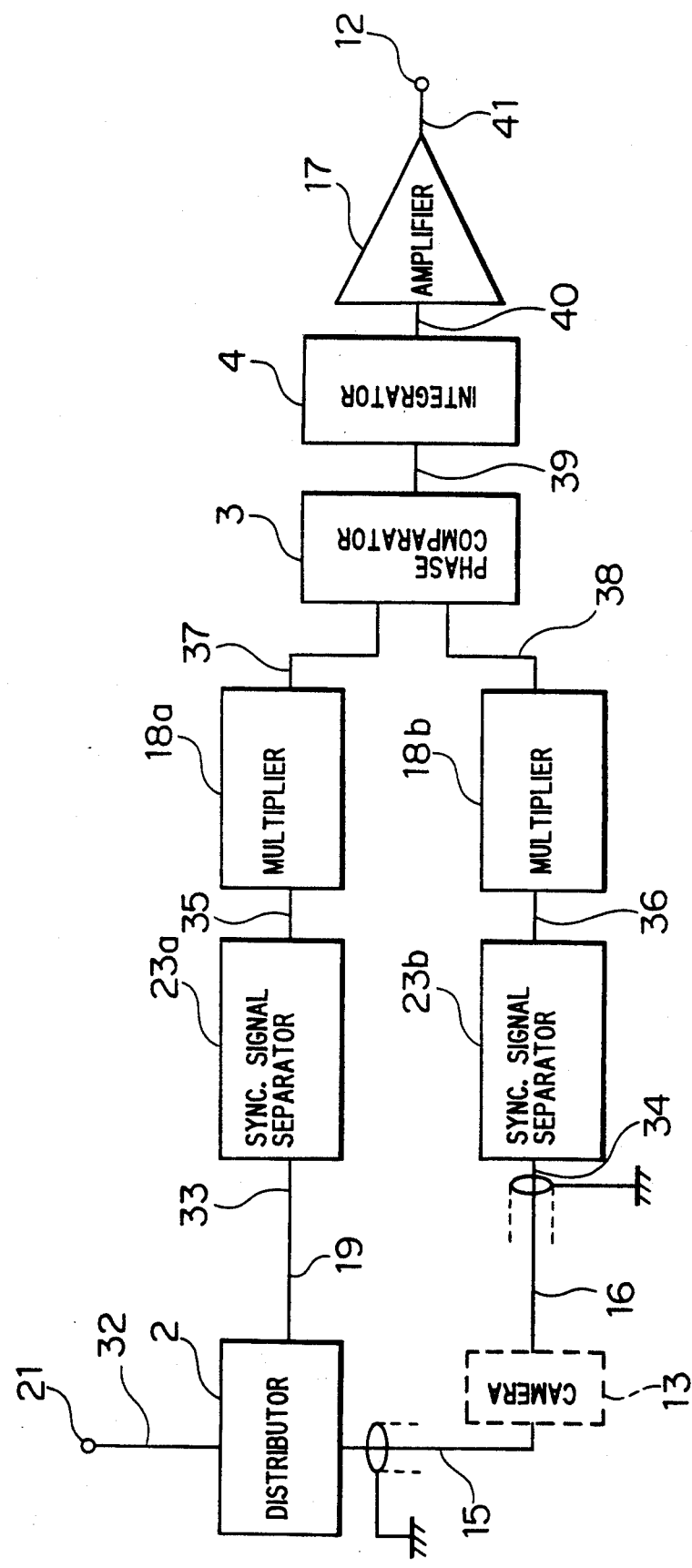
FIG. 9 shows a block diagram of a third embodiment.

FIG. 9 shows the third embodiment of the present invention.

An information signal, for example, a video signal 32 applied to the input terminal 21 is divided into two parts by the distributor 2. One of the divided signals is applied to a synchronous signal separator 23a as a signal 33 through the cable 19 of a known length $L_1$. Only the synchronous signal 35 is extracted by the separator and it is multiplied by the multiplier 18 to have a frequency which is N times higher to produce a signal 37.

The other of the divided signals is transmitted through the cables 15 and 16 of unknown length $L_2$ to produce a signal 34 which is delayed relative to the other signal 33 depending on the cable length difference $L_2 - L_1$. The phase-delayed signal 34 is applied to a synchronous signal separator 23b where only the synchronous signal 36 is extracted and it is supplied to a multiplier 18b to produce a signal 38 having N times higher frequency.

The two frequency-multiplied signals 37 and 3 are compared by the phase comparator 3 to produce a phase comparison output pulse 39 having a pulse width representing the cable length difference. It is then averaged by the integrator 4 to produce a cable length detection information signal 40.

Figure 10:
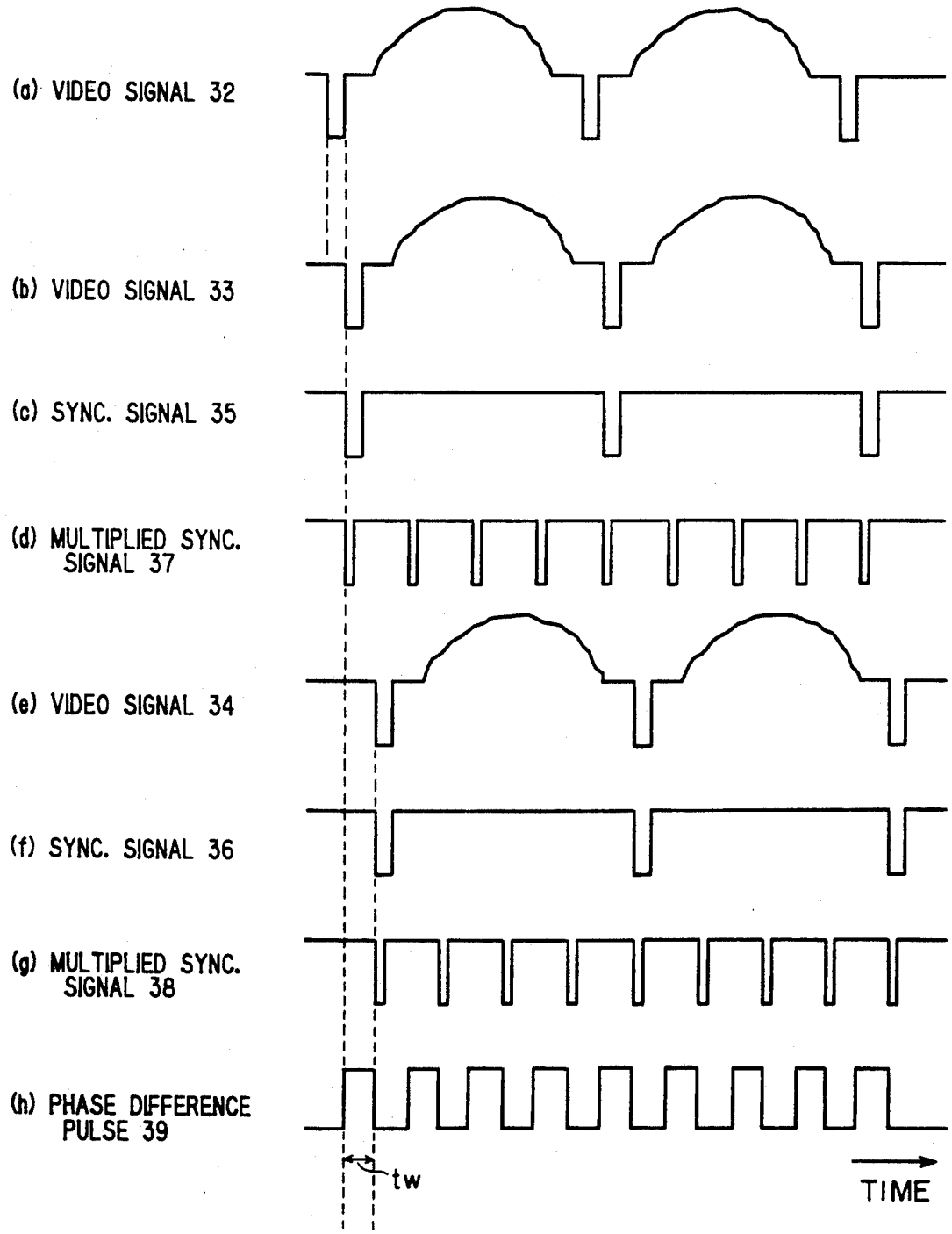
FIG. 10 shows a timing chart of signal waveforms at various points in the third embodiment.

FIG. 10 shows a timing chart of the signals at various points in the present embodiment and it is explained in connection with FIG. 9.

(a) of FIG. 10 shows the video signal 32, and (b) of FIG. 10 shows the video signal 33 divided by the distributor 2 and transmitted through the cable 9. The synchronous signal is separated from the video signal 33 by the synchronous signal separator 23a. The extracted synchronous signal 35 is shown in (c) of FIG. 10. The frequency of the synchronous signal 35 is multiplied by the multiplier 18a by the factor of N (for example, 4) to produce the signal 37 ((d) of FIG. 10).

A waveform of the delayed video signal 34 supplied from the distributor through the cables 15 and 16 is shown in (e) of FIG. 10, and the synchronous signal 36 extracted from the video signal 34 by the synchronous signal separator 23b is shown in (f) of FIG. 10, and the signal 38 multiplied by the factor of N by the multiplier 8b is shown in (g) of FIG. 10. The signals 37 and 38 ((d) and (g) of FIG. 10) are compared by the phase comparator 3 to produce the phase comparison output pulse (phase difference pulse) 39 ((h) of FIG. 10).

In the present embodiment, the reference signal is extracted from the video signal transmitted through the video signal transmission cable without using a separate cable length detection cable, to produce the phase comparison synchronous signal and it is frequency-multiplied for the phase comparison. Accordingly, a high precision cable length detection apparatus is attained.

In the second and third embodiments, the frequency-multiplied synchronous signal 26 or 37 is derived by processing the video signal 22 or 32 supplied through the distributor 2. Alternatively, a separately generated synchronous signal ma be used to attain the same effect. In this case, the distributor 2 and the synchronous signal separator 23a may be omitted.

Figure 11:
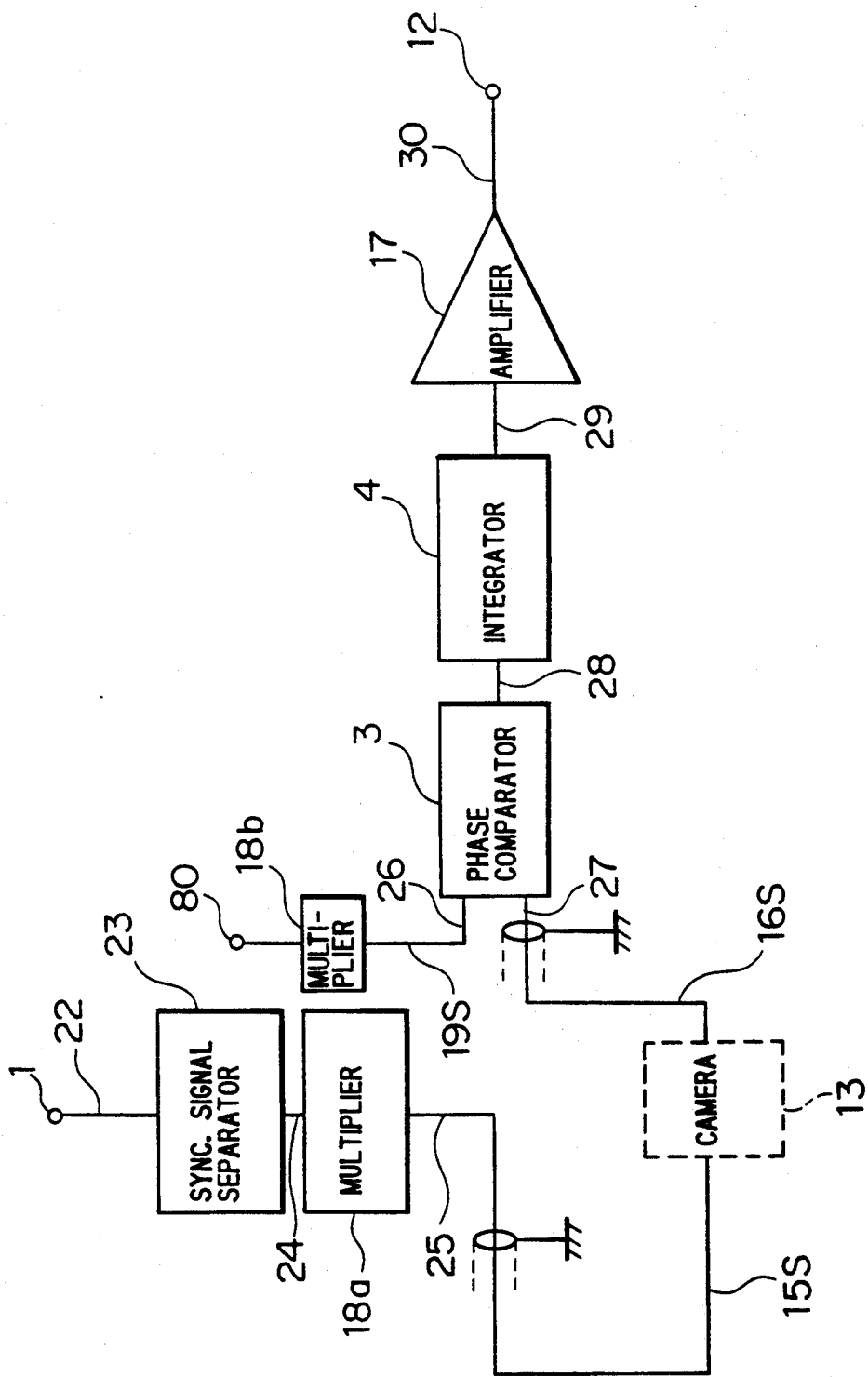
FIGS. 11 and 12 show block diagrams of modifications of the second and third embodiments, respectively.

In the second embodiment, as shown in FIG. 11, a signal which is in synchronism with the horizontal synchronous signal in the video signal 22 may be generated by a circuit (not shown), applied to the input terminal 80, frequency-multiplied by the multiplier 18b by the factor of N, and it may be supplied to the phase comparator 3 through the cable 19S of the known length $L_1$.

Figure 12:
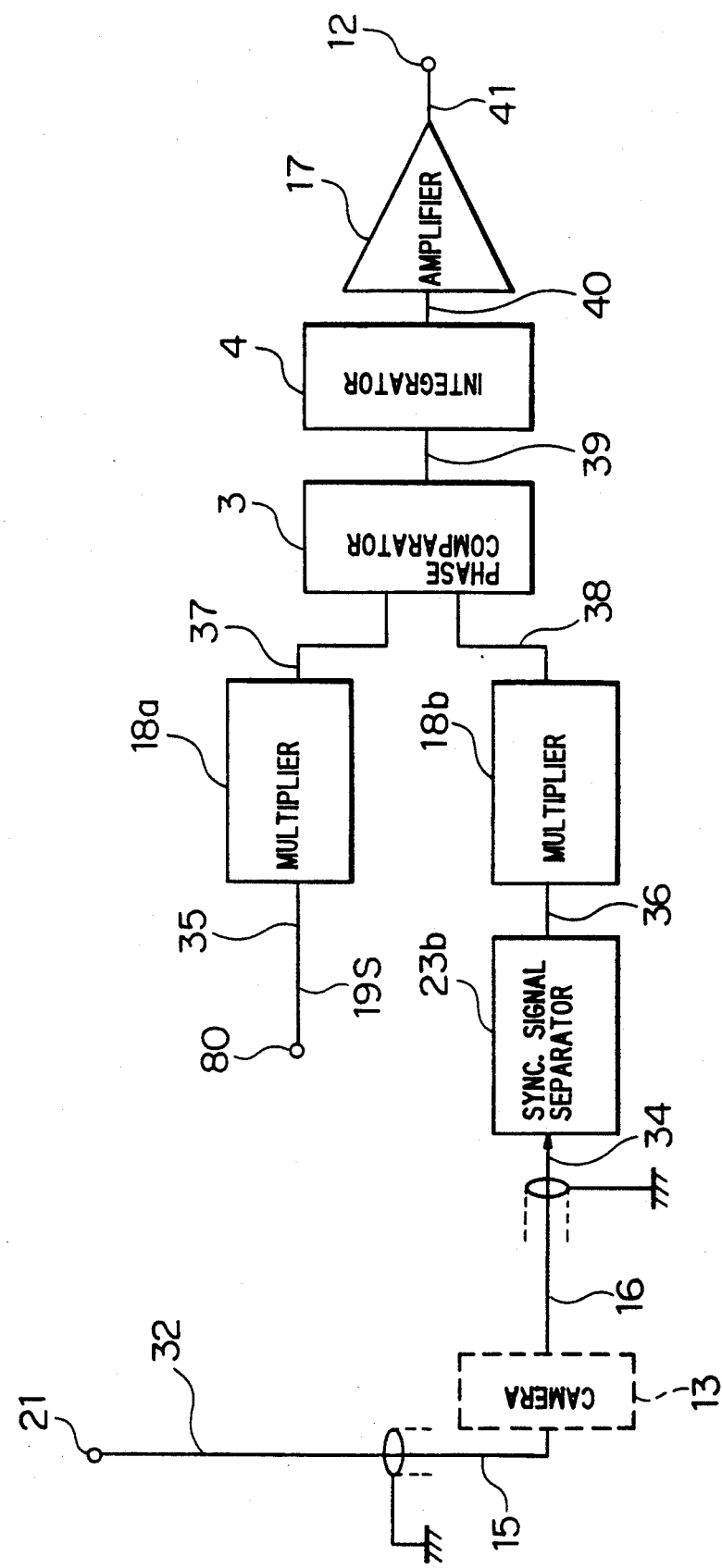

Similarly, in the third embodiment, as shown in FIG. 12, a signal which is in synchronism with the horizontal synchronous signal in the video signal 32 may be applied to the input terminal 80 and supplied to the multiplier 18a through the cable 19S of the known length $L_1$.

In the above embodiments, the horizontal synchronous signal is used as the reference signal although a vertical synchronous signal may be used instead. Where the video signal is used as the information signal, a black level signal or a signal indicating the beginning of the video signal may be used as the reference signal. Where the present invention is used to detect the length of the cable connecting the information equipments, a start bit or stop bit of the information signal transmitted over the cable may be used as the reference signal.

Figure 13:
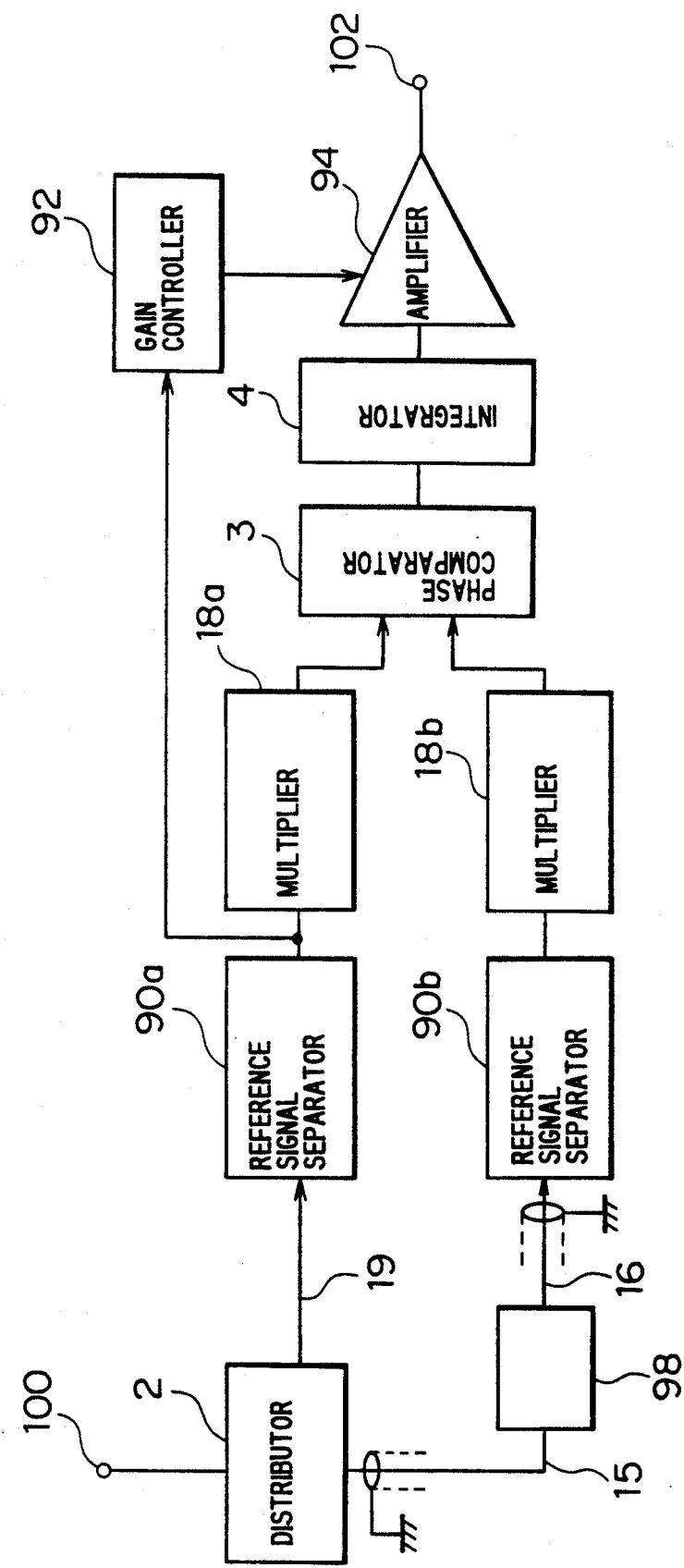
FIG. 13 shows a block diagram of a fourth embodiment.

In the above embodiments, the fixed period signal is used as the reference signal although a non-fixed period signal may be used instead. A fourth embodiment which uses a reference signal of a non-fixed frequency is shown in FIG. 13. In the present embodiment, the third embodiment is modified to cope with the reference signal having the non-fixed frequency. It is also applicable to others of the above embodiments. In FIG. 13, numeral 100 denotes a terminal to which the information signal is applied, and numeral 2 denotes a distributor which distributes the information to a reference signal separator 90a on one hand through the cable 19 of the known length, and a reference signal separator 90b on the other hand through the cable 15, the information equipment 98 and the cable 16. The reference signal separators 90a and 90b extract the reference signals from the information signals on the cables 19 and 16, respectively, and supply them to the multipliers 18a and 18b. Numeral 94 denotes a variable gain amplifier and numeral 92 denotes a gain controller which supplies to the amplifier 94 gain control signal corresponding to the frequency of the reference signal extracted by the separator 90a or 90b. It may be a frequency/voltage converter. The gain controller 92 produces a signal having a higher amplitude as the frequency of the reference signal goes higher so that the gain of the amplifier 94 is lowered.

The above configuration attains the same effect as that of the third embodiment.

In the above embodiments, the cable 19S or 19 has the known length $L_1$, where it is negligible relative to the lengths of the cables 15 and 16 (or 15S and 16S), the bias compensation in the amplifier 17 is not necessary.

What is claimed is:

1. An apparatus for detecting a cable length by using a repetitively occurring signal as a reference signal, comprising:
   an input terminal for receiving the reference signal;
   a cable for transmitting the reference signal supplied from said input terminal;
   first multiplying means for multiplying a frequency of the reference signal transmitted through said cable by a factor of N (where N is an integer);
   second multiplying means for multiplying a frequency of the reference signal directly transmitted without routing said cable by the factor of N;
   means for detecting a phase difference between the N-multiplied reference signal supplied from said first multiplying means and the N-multiplied reference signal supplied from said second multiplying means; and
   means for producing a signal representing the cable length based on the detected phase difference.

2. A method for detecting a cable length of a cable by using a repetitively occurring signal including a reference signal, comprising the steps of:
   detecting a phase difference between a first frequency-multiplied signal of the reference signal being transmitted through said cable and a second frequency-multiplied signal of the reference signal directly transmitted without routing said cable; and
   generating a signal corresponding to the cable length of said cable based on the detected phase difference.

3. A method for detecting a cable length according to claim 2, wherein said detecting step includes a first step of multiplying a frequency of the reference signal by an integer N to generate a multiplied reference signal and a second step of transmitting the multiplied reference signal through said cable.

4. A method for detecting a cable length according to claim 2, wherein said detecting step includes a first step of transmitting the references signal through said cable, and second step of multiplying a frequency of the reference signal transmitted through said cable by an integer N to obtain said first frequency-multiplied signal and multiplying a frequency of the reference signal transmitted without routing said cable by the integer N to obtain aid second frequency-multiplied signal.

5. A method for detecting a cable length according to claim 2, wherein the detecting step includes a step of averaging a plurality of detected phase differences to generate the signal.

6. A method for detecting a cable length according to claim 2, wherein a frequency of the reference signal is fixed.

7. A method for detecting a cable length according to claim 2, wherein the reference signal is a synchronous signal.

8. A method for detecting a cable length according to claim 2, wherein the respectively occurring signal is a video signal.

9. An apparatus for detecting a cable length of a cable by using a repetitively occurring signal including a reference signal, comprising:
means for detecting a phase difference between a first frequency-multiplied signal of the reference signal transmitted through said cable and a second frequency-multiplied signal of the reference signal directly transmitted without routing said cable; and
means for generating a signal corresponding to the cable length of said cable based on the detected phase difference.

10. An apparatus for detecting a cable length according to claim 9, wherein said detecting means includes an input terminal for receiving the reference signal, means for multiplying a frequency of the reference signal received from said input terminal by an integer N, means for transmitting the multiplied reference signal through said cable, and wherein said multiplied reference signal is the first frequency-multiplied signal and the multiplied reference signal directly transmitted without routing said cable is the second frequency-multiplied signal.

11. An apparatus for detecting a cable length according to claim 9, wherein said detecting means includes an input terminal for receiving the reference signal, means for transmitting the reference signal through said cable, first multiplying means for multiplying a frequency of the reference signal transmitted through said cable by an integer N to obtain said first frequency-multiplied signal, and second multiplying means for multiplying a frequency of the reference signal transmitted without routing said cable by the integer N to obtain said second frequency-multiplied signal.

12. An apparatus for detecting a cable length according to claim 9, wherein the detecting means includes averaging means for averaging a plurality of detected phases differences to generate the signal.

13. An apparatus for detecting a cable length according to claim 9, wherein a frequency of the reference signal is fixed.

14. An apparatus for detecting a cable length according to claim 9, wherein the reference signal is a synchronous signal.

15. An apparatus for detecting a cable length according to claim 9, wherein the repetitively occurring signal is a video signal.

16. A method for detecting a cable length by using a repetitively occurring signal as a reference signal, comprising the steps of:
transmitting the reference signal through said cable;
multiplying a frequency of the reference signal transmitted through said cable by a factor of N (where N is an integer);
multiplying a frequency of the reference signal directly transmitted without routing said cable by the factor of N;
detecting a phase difference between the reference signal transmitted through said cable and multiplied by the factor of N and the reference signal directly transmitted without routing said cable and multiplied by the factor of N; and
producing a signal representing the cable length based on the detected phase difference.

17. A method for detecting a cable length according to claim 16 wherein said step of producing the signal representing the cable length includes a step of averaging a plurality of detected phase differences to produce the signal representing the cable length.

18. A methods for detecting a cable length according to claim 16 wherein a frequency of the reference signal is fixed.

19. A method for detecting a cable length by using an information signal including a repetitively occurring signal as a reference signal, comprising the steps of:
transmitting the information signal through said cable;
extracting the reference signal from the information signal transmitted through said cable and multiplying a frequency of the extracted reference signal by a factor of N (where N is an integer);
extracting the reference signal from the information signal directly transmitted without routing said cable and multiplying a frequency of the extracted reference signal by the factor of N;
detecting a phase difference of the reference signal transmitted through said cable and multiplied by the factor of N and the reference signal directly transmitted without routing said cable and multiplied by the factor of N; and
producing a signal representing the cable length based on the detected phase difference.

20. A method for detecting a cable length according to claim 19 wherein said step of producing the signal representing the cable length includes a step of averaging a plurality of detected phase differences to produce the signal representing the cable length.

21. A method for detecting a cable length according to claim 20 wherein a frequency of the reference signal is fixed.

22. A method for detecting a cable length according to claim 21 wherein said reference signal is a synchronous signal.

23. A method for detecting a cable length according to claim 22 wherein said information signal is a video signal.

24. An apparatus for detecting a cable length by using an information signal including a repetitively occurring signal as a reference signal, comprising:
an input terminal for receiving the information signal;

first extraction means for extracting the reference signal from the information signal transmitted through said cable;

second extraction means for extracting the reference signal from the information signal directly transmitted without routing said cable;

first multiplying means for multiplying a frequency of the reference signal extracted by said first extraction means by a factor of N (where N is an integer);

second multiplying means for multiplying a frequency of the reference signal extracted by said second extraction means by the factor of N;

means for detecting a phase difference between the N-multiplied reference signal supplied by said first multiplying means and the N-multiplied reference signal supplied by said second multiplying means; and means for producing a signal representing the cable length based on the detected phase difference.

25. An apparatus for detecting a cable length according to claim 24 wherein said means for producing the signal representing the cable length includes averaging means for averaging plurality of detected phase differences to produce the signal representing the cable length.

26. An apparatus for detecting a cable length according to claim 25 wherein said averaging means includes an integrator.

27. An apparatus for detecting a cable length according to claim 24 wherein a frequency of the reference signal is fixed.

28. An apparatus for detecting a cable length according to claim 27 wherein said reference signal is a synchronous signal.

29. An apparatus for detecting a cable length according to claim 28 wherein said information signal is a video signal.

* * * * *